United States Patent
Kathan

(10) Patent No.: US 8,429,402 B2
(45) Date of Patent: Apr. 23, 2013

(54) METHOD AND ARRANGEMENT FOR AUTHENTICATING A CONTROL UNIT AND TRANSMITTING AUTHENTICATION INFORMATION MESSAGES TO THE CONTROL UNIT

(75) Inventor: Berthold Kathan, München (DE)

(73) Assignee: Océ Printing Systems GmbH, Poing (DE)

( * ) Notice: Subject to any disclaimer, the term of this patent is extended or adjusted under 35 U.S.C. 154(b) by 1793 days.

(21) Appl. No.: 10/533,148

(22) PCT Filed: Oct. 27, 2003

(86) PCT No.: PCT/EP03/11906
§ 371 (c)(1),
(2), (4) Date: Jul. 7, 2005

(87) PCT Pub. No.: WO2004/039032
PCT Pub. Date: May 6, 2004

(65) Prior Publication Data
US 2005/0278528 A1    Dec. 15, 2005

(30) Foreign Application Priority Data
Oct. 28, 2002    (DE) .................................. 102 50 195

(51) Int. Cl.
*H04L 29/06*    (2006.01)
(52) U.S. Cl.
USPC ............. 713/168; 713/169; 358/1.1; 726/34; 380/277; 380/282; 380/286
(58) Field of Classification Search ........................ None
See application file for complete search history.

(56) References Cited

U.S. PATENT DOCUMENTS 5,077,795 A    12/1991  Rourke et al.
6,144,848 A *  11/2000  Walsh et al. .................. 455/419

(Continued)

FOREIGN PATENT DOCUMENTS

EP    0 513 549    11/1992
WO    WO 01/91398    11/2001

OTHER PUBLICATIONS

Campos, Frank T.; Mills III, Nathaniel W.; Graves, Michael L. A Reference Architecture For Remote Diagnostics And Prognostic Aplications. IEEE Autotestcon Proceedings. Pub. Date: 2002. Relevant pp. 842-853. Found on the World Wide Web at: http://ieeexplore.ieee.org/stamp/stamp.jsp?tp=&arnumber=1047964.*

*Primary Examiner* — Nathan Flynn
*Assistant Examiner* — Jeremiah Avery
(74) *Attorney, Agent, or Firm* — Schiff Hardin LLP

(57) ABSTRACT

In a method and arrangement for authenticating a data processing system, first information is generated by a first data processing system and delivered to a second data processing system for a control unit. First data are transmitted from the second data processing system to the first data processing system over a data line, the first data being generated by the second data processing system with aid of the first information and additional information contained in the second data processing system. Second data are generated by the first data processing system depending on the first data and transmitted from the first data processing system to the second data processing system. Authentication information for authenticating the second data processing system is generated by the second data processing system with aid of the second data.

15 Claims, 4 Drawing Sheets

U.S. PATENT DOCUMENTS

| | | |
|---|---|---|
| 6,233,577 B1 * | 5/2001 | Ramasubramani et al. .................. 707/999.009 |
| 6,424,954 B1 * | 7/2002 | Leon ............................. 705/401 |
| 6,516,316 B1 * | 2/2003 | Ramasubramani et al. .................. 707/999.009 |
| 7,181,017 B1 * | 2/2007 | Nagel et al. .................. 380/282 |
| 7,290,288 B2 * | 10/2007 | Gregg et al. .................... 726/28 |
| 7,421,411 B2 * | 9/2008 | Kontio et al. ................... 705/52 |
| 2002/0002688 A1 | 1/2002 | Gregg et al. |
| 2002/0042884 A1 * | 4/2002 | Wu et al. ....................... 713/201 |
| 2002/0053035 A1 | 5/2002 | Schutzer |

* cited by examiner ing system generates second data depending on the first data and transmits the second data to the second data processing system. The second data processing system generates authentication information for authenticating the second data processing system with the aid of the second data.

METHOD AND ARRANGEMENT FOR AUTHENTICATING A CONTROL UNIT AND TRANSMITTING AUTHENTICATION INFORMATION MESSAGES TO THE CONTROL UNIT

BACKGROUND

The preferred embodiment relates to a method and an arrangement for generating authentication information by means of which a data processing system performs an authentication of a control unit. The preferred embodiment further relates to a method and an arrangement for authenticating a control unit of an electrophotographic printing or copying system.

Known electrophotographic printers and copiers have communication interfaces over which the control units and maintenance computers can be linked with the printer or copier for purposes of control, diagnostic analysis, and maintenance. In particular, security related settings of the printer or copier can be changed with the aid of the maintenance computers. If such modifications are performed by insufficiently qualified operators or unauthorized persons, e.g. over a network connection, the result may be a significant quality degradation and damage or destruction of assemblies of the printer or copier.

In the case of known printers and copiers, a number of so-called user levels are provided, whereby a user can select a user level and verifies his authorization to select this user level by inputting a password. Furthermore, with known printers and copiers, unauthorized persons may be able to acquire information about the structure and control structure of the printer or copier through unsecured access with the aid of the communication interface of the printer or copier. System parameters such as meter counts of the printer or copier, which may be used for billing purposes, can also be manipulated over the communication interface of known printers or copiers.

The European Patent EP 0 513 549 A2 describes an arrangement for controlling and transmitting data between a host computer and a copier control, whereby the communication does not occur until the successful identification of the host computer with the aid of a password. A control unit for communication control is also provided.

U.S. Pat. No. 5,077,795 describes an electronic printing system in which the security of user data and user programs is ensured with the aid of a user profile for each user. The user profiles are managed by a security administrator on site or at a remote location.

However, known access methods offer only an inadequate protection of the printer's internal data and settings. In particular, a substantial risk associated with passwords is that they can be spied on with the aid of program modules that record the keyboard inputs. Another security risk associated with passwords is that they must be delivered to the respective user, whereby it often cannot be guaranteed that unauthorized parties will not acquire knowledge of the passwords during the transmission and/or delivery of the passwords. Nor is there any guarantee that authorized parties will not disseminate the passwords to unauthorized parties. An effective local protection of known printers or copiers could only be achieved by preventing unauthorized parties from gaining physical access to the communication interface of the printer or copier. But in that case the print data could not be transmitted to the printer over a network that is also linked to global networks such as the Internet over which unauthorized parties also have access to the printer. But such techniques also foreclose the possibility of remote maintenance, remote diagnostic analysis, or remote control of the printer by service specialists that are not on site.

SUMMARY

An object is to propose a method and an arrangement with which it is easy to authenticate a data processing system.

In a method and arrangement for authenticating a data processing system, first information is generated by a first data processing system and delivered to a second data processing system for a control unit. First data are transmitted from the second data processing system to the first data processing system over a data line, the first data being generated by the second data processing system with aid of the first information and additional information contained in the second data processing system. Second data are generated by the first data processing system depending on the first data and transmitted from the first data processing system to the second data processing system. Authentication information for authenticating the second data processing system is generated by the second data processing system with aid of the second data.

DESCRIPTION OF THE PREFERRED EMBODIMENT

Figure 1:
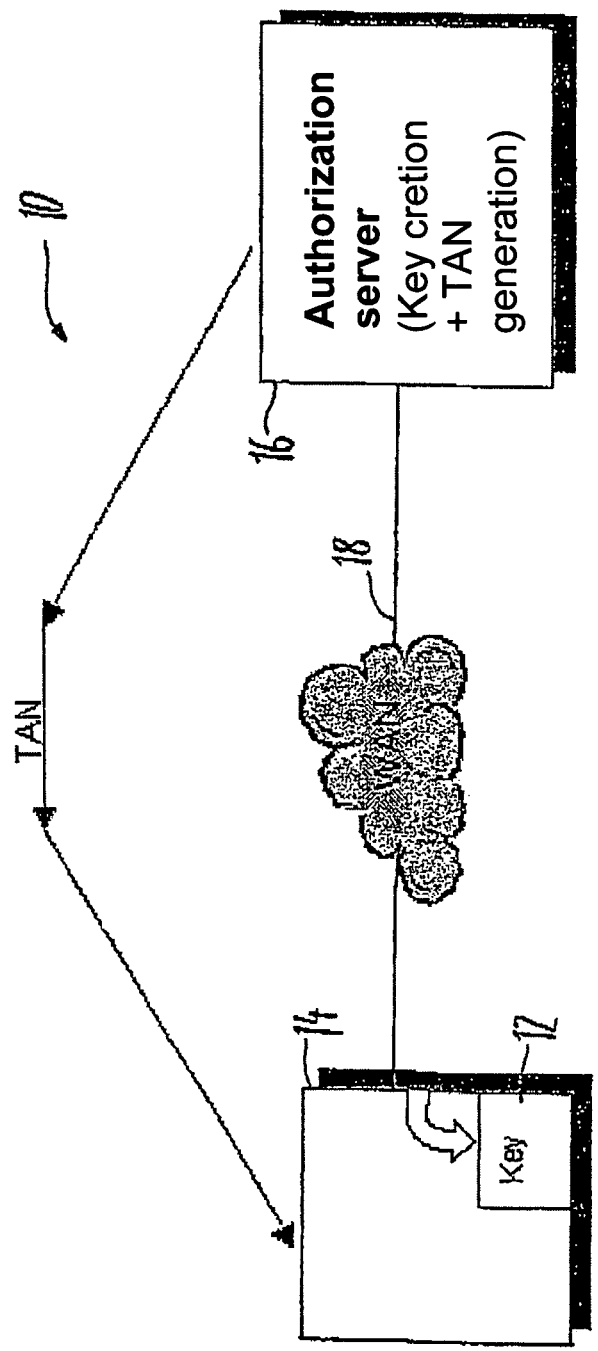
FIG. 1 is a block wiring diagram of a system for generating and transmitting a key for authenticating a service and maintenance computer.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

What a method for authenticating a data processing system achieves is that the second data are supplied to the second data processing system in a very secure fashion, and with the aid of the second data, the second data processing system generates authentication information with which an authentication procedure can be advantageously executed automatically without intervention by a human operator.

A second aspect of the preferred embodiment relates to an arrangement for authenticating a data processing system. A first data processing system generates first information. The first information is sent to a second data processing system of a control unit. The second data processing system generates first data with the aid of the first information and additional information that is contained in the second data processing system. The arrangement contains a data line over which first data are transmittable from the first data processing system to the second data processing system. The first data processing system generates second data depending on the first data. The second data are transmittable from the first data processing system to the second data processing system over the data line. With the aid of the second data, the second data processing system generates authentication information for authenticating the second data processing system.

The effect of this arrangement of the preferred embodiment is that the generation and transmission of the second data for generating the authentication information by means of the second data processing system can be executed easily and without complex user intervention. Furthermore, because the second data processing system generates the authentication information with the aid of the second data, an authentication of the second data processing system by an additional data processing system and/or the first data processing system is easy to realize.

A third aspect of the preferred embodiment relates to a method for authenticating a control unit of an electrophotographic printing or copying system. First data are stored in a first data processing system of the control unit. The first data processing system generates authentication information with the aid of the first data. With the aid of authentication data the authentication information is transmitted to a second data processing system of the printing or copying system. The authenticity of the first data processing system is checked or validated by the second data processing system. With the aid of the authentication data, access rights for the first data processing system are defined by the second data processing system.

An authentication of the control unit and the defining of access rights of the control unit are very easy with the method of the preferred embodiment. Complicated and costly user interventions by a human operator are not required in order to authenticate the control unit.

A fourth aspect of the preferred embodiment relates to an arrangement for authenticating a control unit of an electrophotographic printing or copying system. First data are stored in a first data processing system of the control unit. The first data processing system generates authentication information with the aid of the first data. The first data processing system transmits authentication data to a second data processing system of the printing or copying system, which data contain the authentication information. The second data processing system checks the authenticity of the first data processing system, whereby it defines access rights of the first data processing system with the aid of the authentication data. With this arrangement of the preferred embodiment an authentication of the control unit can be executed very easily by the control unit of the printing or copying system. Such authentication does not require intervention by a human operator. Furthermore, with this arrangement a very secure authentication of the control unit is performed, and foreign or external access to the data processing system of the printing or copying system is prevented.

FIG. 1 represents a system 10 for generating and transmitting a key 12 that serves for the authenticating of a service and maintenance computer 14 by an additional data processing unit of a printer which is not represented. The system 10 contains an authorization server 16 that is linkable with the service and maintenance computer over a network connection 18. The generation and transmission of the key 12 is also referred to as an approval or enable procedure of the service and maintenance computer 14. A data connection between the service and maintenance computer 14 and the authorization server 16 is needed for this approval procedure, for instance over network 18.

The authorization server 16 generates what is known as a transaction number (TAN). The transaction number is a series of numbers and/or letters that a human operator must enter at the service and maintenance computer in order to execute the approval procedure. The transaction number generated by the authorization server 16 is sent to the operator by mail or e-mail. The operator is preferably a service technician from the printer manufacturer with a portable computer, a so-called notebook, as the service and maintenance computer 14. The service technician's service and maintenance computer 14 is referred to hereinafter as the service notebook.

After receiving the transaction number by mail or e-mail, the service technician starts a program module for executing the approval procedure on the service notebook 14. The service technician enters the transaction number by means of an interface and starts the approve operation. The program module detects a predetermined hardware identifier, for instance the serial number of the processor or of an adapter. A hardware identifier of this kind is also referred to as the fingerprint of the service notebook 14. The serial number and transaction number are transmitted to the authorization server 16 over the network connection 18. The authorization server 16 checks the validity of the transaction number and defines an authorization level for the service notebook based on said number, which will subsequently determine the access rights of the service notebook 14 to the control units and databases of a printer when the notebook and printer are linked.

The authorization server 16 also defines a validity date until which an authorization by a printer is possible with the aid of the generated key 12. A period in which a service notebook 14 can be approved with the aid of the transmitted transaction number is also defined. With the aid of the transmitted hardware identifier, validity date, and authorization level, the authorization server 16 generates what is known as a key 12, which contains this information in coded form and/or by means of which this information can at least be checked. The key 12 is transmitted over the network 18 to the service notebook 14 and stored in a memory area of the service notebook 14.

An approval procedure for approving the service notebook 14 is thus implemented by means of the system 10. The key 12 that is stored in the service notebook 14 as a result of this approval procedure contains the hardware identifier, expiration date and access rights of the service notebook 14 in encrypted form.

In other exemplifying embodiments, at least the hardware identifier, the expiration date, and the access rights can be checked with the aid of the key 12. In other exemplifying embodiments the transaction number can also be generated by a separate institution. The transaction number must then be sent to the service technician for entry into the service notebook 14 and entered into the authorization server 16. The network link 18 according to FIG. 1 is a connection via a wide area network such as the Internet. If an Internet connection such as this is chosen, the data transfer occurs with the aid of a secure transmission channel.

Alternatively, in other exemplifying embodiments a point-to-point connection, e.g. by means of a modem, can be transmitted over a public telephone network. In order to enhance transmission security, known encryption methods can be used for data transmission. Furthermore, with the aid of the system 10 a service technician can approve the service notebook 14 from an arbitrary location that is linkable with the network 18. Thus it is also possible to approve the service notebook 14 from a customer's telephone terminal or any other telephone terminal.

If the validity period of key 12 has expired, the service notebook 14 must be reapproved. Reapproval is performed according to the same procedure described for the first approval of the service notebook 14.

Different keys 12 are generated and delivered by the authorization server 16 for different notebooks at the same authorization level. However, the authorization level and validity period can be determined unambiguously from these different keys 12 without the respective key 12 itself having to be known to a data processing system of the printer that checks the authenticity of the service notebook 14. As a result, it is not necessary to inform all printers about which of the technician's notebooks 14 and which other control units have authorization to access the database and/or control units of the respective printer. Such a service notebook 14 is linked with a printer locally or over a network connection 18 as a control unit, it being possible to read the printer's settings and transmit modified settings to it by means of the service notebook 14, to operate the printer by means of the service notebook 14, and to run a diagnostic analysis of the printer or its assemblies by means of the service notebook 14.

For each individual parameter the authorization level until which a read and/or write access to this setting parameter is permitted can be defined by means of the printer software or firmware. Write access to setting parameters is advantageously allowed only to users with a high authorization level.

Figure 2:
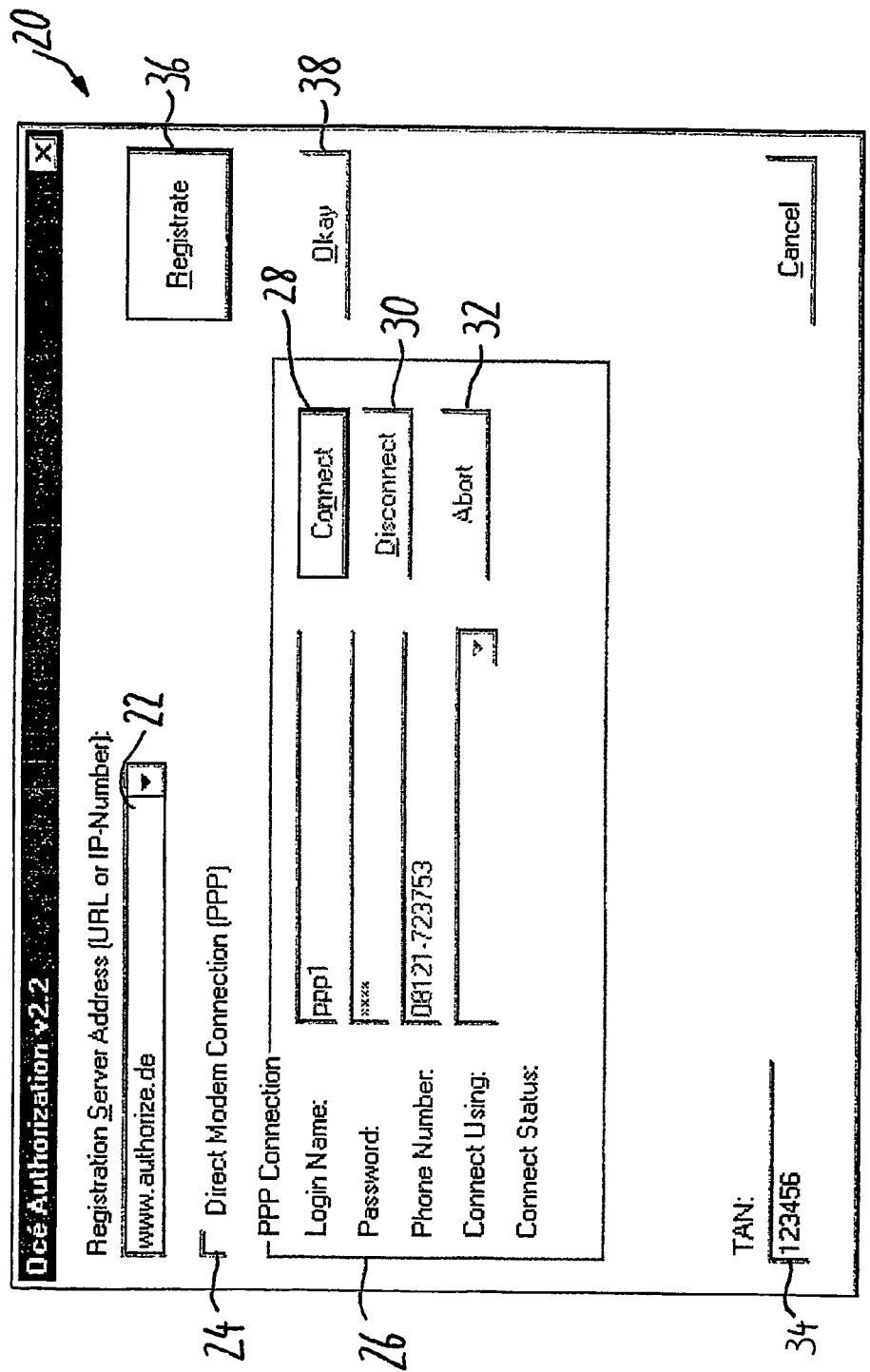
FIG. 2 is a control interface for requesting the key at an authorization server.

FIG. 2 represents a control interface 20 for approving the service notebook 14. The control interface 20 is generated with the program module for approving the notebook 14 that was started by the technician on the notebook 14 and output on a display device of the notebook 14. With the aid of this control interface 20 the operator can choose the type of connection to the authorization server 16. The operator can enter or select the network address or, if the notebook 14 is connected to the authorization server 16 over a network connection of the World Wide Web of the Internet, the Internet address of the authorization server 16 in an input and output field 22. Alternatively, a point-to-point connection of the service notebook 14 to the authorization server 16 can also be set with the aid of a selection field 24 if, for example, the notebook 14 and the authorization server 16 are linkable over modems with the aid of a telephone network. For a point-to-point connection, the operator can enter the required data for the setup of the point-to-point connection in the input region 26. These data relate in particular to a log-in name and a password for setting up the connection and a telephone number via which the authorization server is reachable over the telephone network. A protocol is also selectable.

Region 26 also contains an output field in which the connection status is displayed. A connection over the telephone network can be established with the aid of a graphic button 28. An existing connection can be interrupted with the aid of the graphic button 30, and the setup and dismantling of a connection can be interrupted with the aid of the graphic button 32. The transaction number (TAN) that was sent is entered into input field 34. After inputting the transaction number, the operator can start the registration process at the authorization server with the aid of the graphic button 36, whereby the program module transmits the transaction number and the number of the processor of the service notebook 14 to the authorization server 16. The program module contains special program elements for detecting the serial numbers of the processor.

As described above in connection with FIG. 1, after checking the validity of the transaction number, the authorization server 16 determines a key 12 with the aid of the processor's serial number and other information. After the key 12 is generated, it is transmitted to the notebook 14. The key 12 is stored in a dedicated memory area of the notebook 14. After the key 12 has been successfully transmitted to the notebook 14, the button 38 is displayed as active that the notebook 14 has been successfully approved. Activating the graphic button 38 terminates the approval operation and ends the running of the program module for approval.

Figure 3:
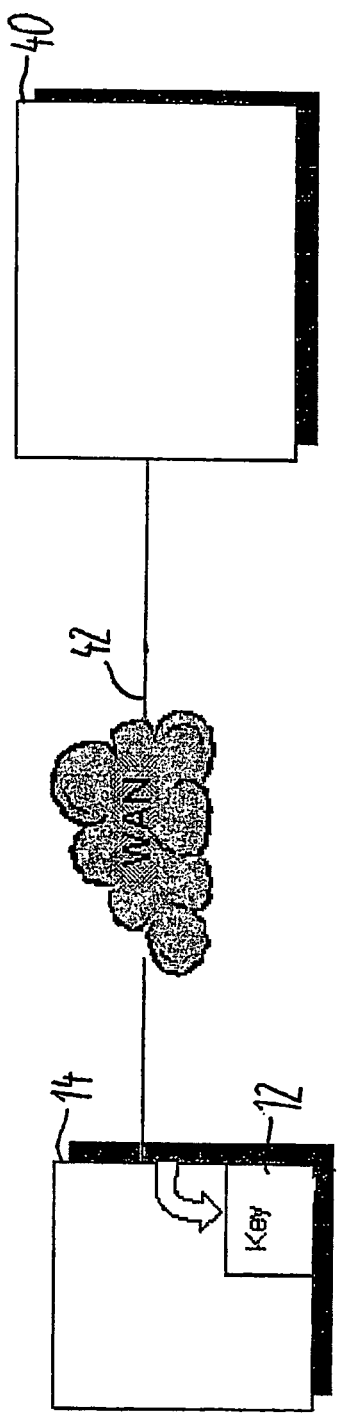
FIG. 3 is a block circuit diagram for the authenticating of the service and maintenance computer by a printer.

FIG. 3 is a block wiring diagram representing the authentication of the notebook 14 by a printer 40. The notebook 14 is connected to the printer 40 over a network connection 42. As explained above in connection with FIGS. 1 and 2, a key 12 is stored in the notebook 14, which contains information about the serial number of the processor, the validity period of the key, and the access rights of the service notebook 14. This information is preferably contained in the key 12 in coded form. Alternatively, this information can at least be checked with the aid of the key 12.

Before the notebook 14 receives access to setting parameters and diagnostic functions of the printer 40, the printer 40 performs an authorization of the service notebook 14. For that purpose, a program module of the printer detects the presence of the key 12 on the service notebook 14 and the authorization level of the notebook 14 over the network 42.

The authorization by the printer 40 is preferably achieved through the challenge and response technique. The printer 40 transmits a random number to the service notebook 14. With the random number, the service notebook 14 performs a non-bypassable mathematical computation operation depending on the key 12. The result of this computation operation is transmitted to the printer 40 over the network connection 42. The printer 40 checks the computation result by performing a mathematical computation operation that leads to the same result. If the two results match, then authentication of the notebook 14 by the printer 40 is successful.

As already mentioned, in the printer 40 it is specified for each setting parameter of the printer 40 whether users with a particular authorization level have read and/or write access to the value of the setting parameter. The service notebook 14 is one such user. Upon the successful authentication of the notebook 14, the printer 40 transmits data for generating a graphic user interface for controlling, configuring, and servicing the printer 40 to the notebook 14. The transmitted data are processed by the notebook with the aid of a browser program module. The graphic user interface preferably contains control interfaces, which are selectably displayed with the aid of menus.

The graphic user interface and the control interfaces are preferably designed in such a way that they are automatically adapted to the authorization level of the notebook 14. If the notebook 14 is not authorized for a read and/or write access of the setting value of a setting parameter based on the assigned authorization level, this setting value is not displayed or is displayed only as inactive. If the notebook 14 lacks authorization to execute a diagnostic function, then this diagnostic function is not offered, i.e. not displayed, with the control interface and/or the menu items. That way, the operating of the control interface at lower authorization levels is easier and more clearly arranged.

With an authorization procedure such as the one described in connection with FIGS. 1 to 3, it is easy to prevent accidental or intentional manipulations and incorrect settings of setting parameters of the printing system. It is possible for the service notebook 14 to access the printer over a direct data line on site as well as remotely over a network connection, e.g. over the Internet or a telephone network. That way, remote maintenance, remote control and remote diagnostic analysis are easy to perform.

If the user interface for operating, configuring, and diagnostically analyzing the printer 40 is transmitted from the printer 40 to the notebook 14 over the network 42 and displayed there with the aid of a display program module, e.g. with the aid of a browser, then all the notebook 14 requires is software for requesting and managing the key 12, which must be stored in a storage area or the notebook 14 in addition to its standard software and processed by the notebook 14. The standard software of the service notebook 14 comprises at least one operating system and one browser program module.

The browser program module advantageously contains a Java Runtime program environment. The processing of Java Applets is very easy with the aid of this Java Runtime environment. With the aid of the Java Applets comprehensive operating, diagnostic, and configuration functions as well as a graphic user interface can be generated, which are output via the browser program module. It is not necessary to transmit and verify passwords. In particular, an inherent risk of such a password is that the password may be disseminated to another technician or operator, for example in the event that the service technician or operator is replaced for a weekend or during a vacation. Often these passwords are also written down and could reach unauthorized parties that way also.

According to the authentication of the preferred embodiment of the service notebook 14, the notebook contains all the data needed for its authentication. In the event of a substitution during a vacation or weekend, the notebook 14 is simply handed over to another technician or operator. The substitute technician or operator does not receive any information with which it is possible to access the printer 40 using another service notebook or another data processing system after returning the service notebook 14.

Figure 4:
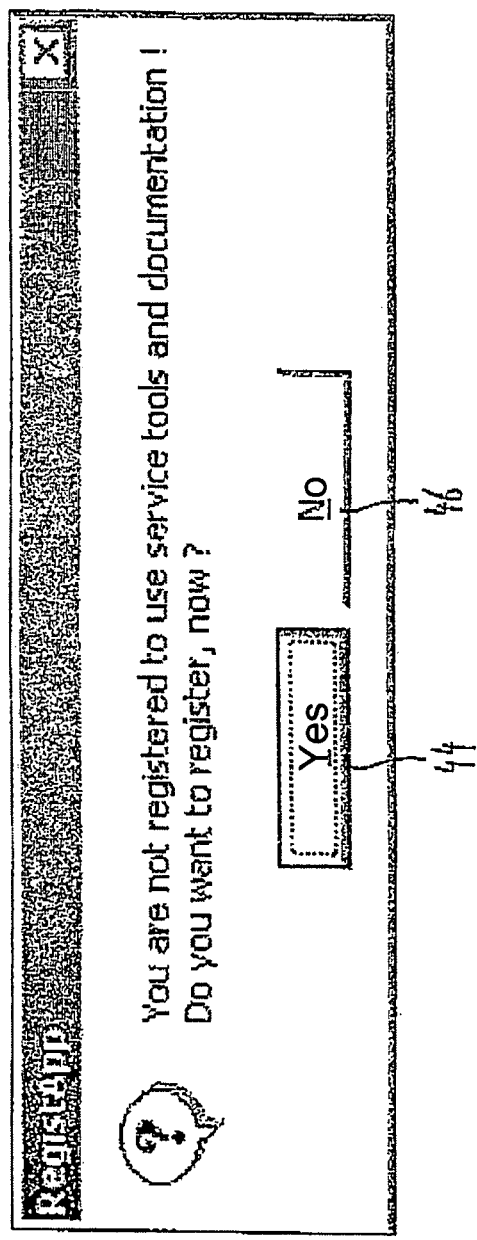
FIG. 4 is an output window with a test message that is output in the event of authorization failure.

FIG. 4 represents an output window with a text message that is output on the notebook 14 in the event of unsuccessful approval and in the event of expiration of approval. With this text message the technician is informed that the notebook 14 is not approved and he has no access to service tools, diagnostic tools, or documentation. Using the graphic button 44, the operator can start the program module for approving the notebook 14, whereby the control interface represented in FIG. 2 is output. But approval as described in connection with FIG. 2 is possible only if the operator has a valid transaction number. If graphic button 46 is activated, the program module for approval is not started, and the service and diagnostic tools requiring an authorization level are not available to the technician at notebook 14, nor is service documentation.

Alternatively to the serial number of the processor, a so-called MAC address of the network card contained in the service notebook 14 can be used as the hardware identifier. The MAC address is also referred to as the Ethernet address. The MAC address is a worldwide unique identifier of a network adapter. It is used in layer 2 of the OSI model for addressing. The MAC address is stored in a ROM memory of the network adapter and cannot be modified by means of program modules of the notebook 14. The MAC address is six bytes long and contains the manufacturer and the serial number of the respective network adapter in encrypted form. The MAC address is readable with known program modules. The MAC address thus serves as a unique identifier of the service notebook 14.

Furthermore, it is expedient to provide several user groups, each with an authorization level allocated to it. With this kind of an authentication, customer data such as overlays, character sets, and other resources can be protected against unauthorized reading or modification. An authorization of other internal and external operating units of the printer can also be performed before these units are given access to the setting parameters and control functions of the printer. The unauthorized operating of the printer 40 that can occur over a network to which the printer 40 is linked is also prevented this way. A cryptography technique with which information is encoded and decoded is preferably used, particularly an asymmetric or symmetric encryption technique. The key 12 can also contain a legitimation code. The key 12 is preferably a public key or a private key. Alternatively, a signature can be used instead of a key.

Despite the representation and detailed description of preferred exemplifying embodiments in the drawings and the description above, these should be understood purely as exemplary and not as limiting the invention. It bears emphasizing that only the preferred exemplifying embodiments are represented and described, and protection is intended to extend to all alterations and further modifications that are or will be within the scope of the invention.

The invention claimed is:

1. A method for authenticating a maintenance and diagnostics service computer for connection to a printing or copying system to be serviced by performing maintenance and diagnostics, comprising the steps of:
generating a transaction information by an authentication server and delivering via a first communication line the transaction information to a user of said maintenance and diagnostics service computer, said transaction information being entered by the user of the service computer into the service computer in order to execute authentication of the service computer;
generating first data by the service computer with aid of the transaction information, said first data including a hardware identifier of hardware contained in the service computer;
transmitting said first data via a second communication line which is distinct from the first communication line from the service computer to the authentication server over said second communication line comprising a data line;
generating key data by the authentication server depending on the first data and transmitting the key data from the authentication server to the service computer over the data line, said key data defining access rights of the service computer;
with the service computer generating authentication information for authenticating the service computer with aid of the key data;
transmitting the authentication information from the service computer directly to a system control unit of said printing or copying system independently of the authentication server and after receiving the key data from the authentication server verifying authenticity of the service computer by the system control unit; and with the system control unit checking said access rights defined by the key data of the service computer, and if access is authorized, servicing by performing said maintenance and diagnostics on the printing or copying system with the maintenance and diagnostics service computer.

2. A method according to claim 1 wherein a check is performed to determine whether the service computer contains the hardware identifier.

3. A method according to claim 1 wherein the key data contain an expiration date in addition to said access rights.

4. A method according to claim 3 wherein the access rights are assigned with aid of an authorization level.

5. A method according to claim 1 wherein the key data are transmitted in encrypted form.

6. A method according to claim 1 wherein the data line comprises a network connection.

7. A method according to claim 1 wherein the data line comprises a point-to-point connection.

8. A method according to claim 1 wherein the transaction information comprises a transaction number.

9. A method according to claim 1 wherein the transaction information is sent per e-mail or mail to the user.

10. A method according to claim 9 wherein the transaction information that is sent to the service computer is entered by way of an input unit of the service computer.

11. A method according to claim 1 wherein said hardware identifier of the service computer that cannot be modified by a user is used as said hardware identifier.

12. A method according to claim 1 wherein said authenticity verifying by the authentication server is performed with aid of a challenge/response procedure.

13. A method according to claim 1 wherein the key data contain a signed certificate.

14. A method according to claim 1 wherein the key data contains a key, and the authentication information sent to the printing or copying system contains an authentication code generated with the aid of the key.

15. A system for authenticating a maintenance and diagnostics service computer for connection to a printing or a copying system to be serviced by performing maintenance and diagnostics, comprising:

an authentication server which generates a transaction information and delivers via a first communication line the transaction information to a user of said maintenance and diagnostics service computer, said transaction information being entered by the user of the service computer into the service computer in order to execute authentication of the service computer;

said service computer generating first data with aid of the transaction information, said first data including a hardware identifier of hardware contained in the service computer;

said service computer transmitting via a second communication line which is distinct from the first communication line said first data from the service computer over to the authentication server over second communication line comprising a data line;

said authentication server generating key data depending on the first data and transferring the key data from the authentication server to the service computer over the data line, said key data defining said access rights of the service computer;

said service computer generating authentication information for authenticating the service computer with aid of the key data;

said service computer transmitting the authentication information from the service computer directly to a system control unit of said printing or copying system independently of the authentication server and after receiving the key data from the authentication server;

said system control unit verifying authenticity of the service computer; and said system control unit checking said access rights defined by the key data of the service computer and if access is authorized, servicing by performing said maintenance and diagnostics on the printing or copying system with the maintenance and diagnostics service computer.

* * * * *